May 22, 1923.                           1,456,117
J. BILAN
VEHICLE SPRING
Filed Oct. 13, 1922

Inventor
John Bilan
By T. D. Bryant
Attorney

Patented May 22, 1923.

1,456,117

UNITED STATES PATENT OFFICE.

JOHN BILAN, OF FLINT, MICHIGAN.

VEHICLE SPRING.

Application filed October 13, 1922. Serial No. 594,321.

*To all whom it may concern:*

Be it known that I, JOHN BILAN, a citizen of Ukraine, residing at Flint, in the county of Genesee and State of Michigan, have invented certain new and useful Improvements in Vehicle Springs, of which the following is a specification.

My invention relates to new and useful improvements in vehicle springs and has particular reference to springs employed upon motor vehicles, the primary object thereof being the provision of such springs that are comparatively simple of construction and inexpensive of manufacture.

A further object of the invention resides in the provision of a vehicle spring wherein the separate leaf members, comprising the spring, have a housing positioned thereover tending to prevent the accumulation of dirt or other matter thereon, which accumulation generally impairs the proficient operation of the springs.

With the above and other objects in view as the nature of the invention will be better understood, the same consists of the novel form, combination and arrangement of parts hereinafter more fully described, shown in the accompanying drawing and claimed.

Figure 1:
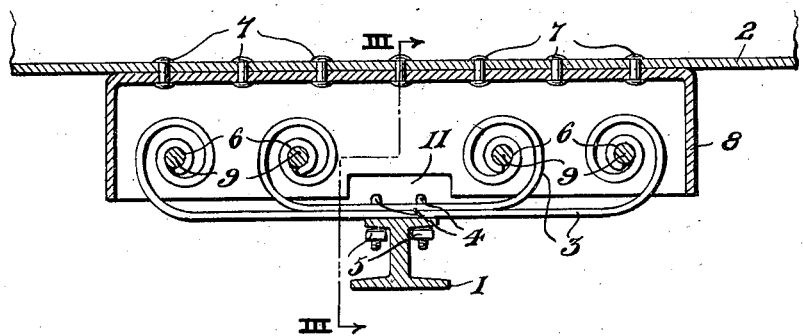
Figure 2:
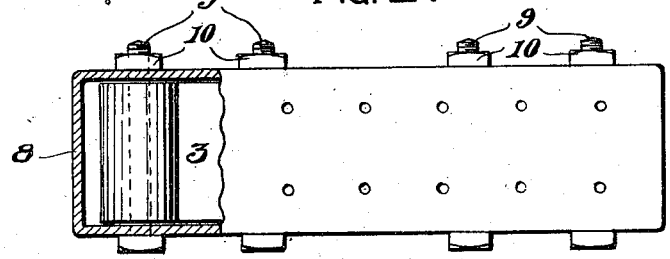
Figure 3:
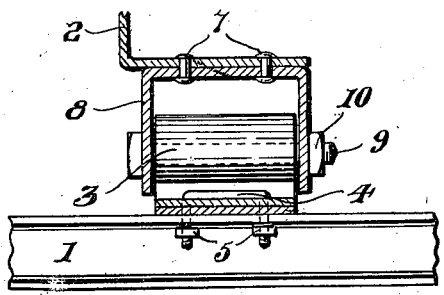

In the drawing, wherein like reference characters designate corresponding parts throughout the several views, Figure 1 is a longitudinal sectional view of a vehicle spring constructed in accordance with the present invention, the same being shown as applied to a vehicle, Figure 2 is a fragmentary top plan view of the device as shown in Fig. 1, and Figure 3 is a vertical cross sectional view upon the line III—III of Fig. 1 and looking in the direction of the arrows, the vehicle axle and chassis bar being fragmentarily shown.

Referring to the several views, there is shown a vehicle axle 1, of conventional type, and a portion of a vehicle chassis bar 2 of usual L-shaped configuration. Rigidly secured upon the upper face of the axle 1 are the leaf members 3, forming the spring. Any desired means may be provided for rigidly securing the separate leaf members to the axle 1, but for purposes of illustration I have shown this securing means as including a pair of spaced inverted U-members 4, the legs of which pass through spaced openings within the leaves of the spring and thence through alined openings in the oppositely projecting side flanges of the axle 1. The projecting ends of these strap members are suitably screw-threaded for receiving thereon retaining nuts 5.

I have shown my spring as being formed from but two leaf sections 3, but it is obvious that any number of these sections may be provided. The outer ends of each of the leaf members 3 are curved upwardly as shown and thence rolled upon themselves so as to provide eye portions 6 in the opposite ends thereof.

Riveted or otherwise secured as at 7 to the under surface of the vehicle frame bar 2 is a spring housing 8 of inverted U-shape in cross section. The side walls forming the housing 8 are suitably perforated, for registering with the eye portions 6 of the leaf members 3, comprising the spring, whereby when the perforations in the side walls of the housing aline with the said eyes of the leaf members suitable locking bolts 9 may be inserted therethrough for rigidly connecting the said leaf members to the housing 8. The projecting ends of each of the bolt members 9 are screw-threaded for receiving thereon retaining nuts 10. The lower edge of the side walls forming the housing 8 are suitably centrally notched or cutaway as at 11 for readily permitting the lower edge of the side walls of the housing to project below the upper surface of the axle 1 whenever there is occasioned a springing movement of the leaf members 3.

From the above description it will be readily apparent even to those unskilled in the art that I have provided a vehicle spring including a novel form of leaf members comprising the spring and also an effectual means for covering the leaf elements of the spring for the prevention of the accumulation of direct or other foreign matter thereon.

Minor changes may be made in the invention without departing from the spirit and scope thereof as claimed.

What is claimed as new is:

In vehicle springs, the combination with a vehicle axle and chassis bar, of a spring member centrally supported upon said axle and including separate leaf sections, the opposite ends of each of the leaf sections having eyes formed therein, and a depending hood member carried by said chassis bar and engaging over said spring member, the side walls of said hood having suitably spaced perforations therein for alinement with the eyes of the leaf sections of the spring whereby securing means are received therethrough for rigidly securing said hood member to the leaf sections of the spring.

In testimony whereof I affix my signature.

JOHN BILAN.